United States Patent
Shimbo et al.

[15] 3,658,409
[45] Apr. 25, 1972

[54] DIGITAL LIGHT DEFLECTOR

[72] Inventors: Chiaki Shimbo, Mitaka; Hiroomi Kojima, Hachioji; Michio Sekiya, Hachioji; Kiyoo Takeyasu, Hachioji; Sadao Nomura, Tokyo, all of Japan

[73] Assignee: Hitachi, Ltd., Tokyo, Japan

[22] Filed: July 1, 1970

[21] Appl. No.: 51,417

[30] Foreign Application Priority Data

July 11, 1969  Japan.................................44/54508

[52] U.S. Cl..............................350/150, 350/157, 350/160, 350/DIG. 2
[51] Int. Cl..........................................G02f 1/26
[58] Field of Search.............350/147, 150, 157, 160, DIG. 2; 340/173 LT, 173 LS, 173.2

[56] References Cited

UNITED STATES PATENTS

| | | | |
|---|---|---|---|
| 3,499,700 | 3/1970 | Harris et al. | 350/DIG. 2 |
| 3,391,972 | 7/1968 | Harris et al. | 350/DIG. 2 |

OTHER PUBLICATIONS

Harris et al., " Digital Laser Beam Deflection" Laser Focus Vol. 3, No. 7 (April 1967) pp. 26– 32
Schmidt, " A High Speed Digital Light Beam Deflector" Phys. Lett. Vol. 12, No. 3 (Oct. 1, 1964) pp. 205– 206
Kukke et al., " A Fast, Digital–Indexed Light Deflector" IBM J. Research Develop. Vol. 8 (Jan. 1964) pp. 64– 67
Lee et al., " Transmission and Self-Generated Noise Characteristics of Polarization Scanned Digital Optical Systems" App. Opt. Vol. 3, No. 11 (November 1964) pp. 1305– 1310

*Primary Examiner*—David Schonberg
*Assistant Examiner*—Paul R. Miller
*Attorney*—Craig, Antonelli & Hill

[57] ABSTRACT

Electro-optic crystal elements and uniaxial birefringent crystals are alternately aligned together and an additional electro-optic crystal element followed by a polarizing plate is further aligned with the last stage birefringent crystal. Each of the electro-optic crystal elements has opposite faces provided thereon with transparent electrodes to which a half-wavelength voltage is selectively applied whereby undesired light components are shut off by the polarizing plate to thereby improve S/N (signal to noise) ratio.

1 Claims, 3 Drawing Figures

FIG. I PRIOR ART ated potassium dihydrogen phosphate (hereinafter referred
DIGITAL LIGHT DEFLECTOR This invention relates to a light deflection system and more particularly to a digital light deflection comprising in combination of electro-optic crystals and a uniaxial birefringent crystal.

DESCRIPTION OF THE PRIOR ART

Such a system as being proposed by T.J. Nelson et al. at Bell Telephone Laboratories in the U.S.A. is known as a digital light deflector. This system comprises a cascade arrangement of n stages of deflection units each composed of a crystal with an electro-optical effect and a uniaxial birefringent crystal.

Figure 1:
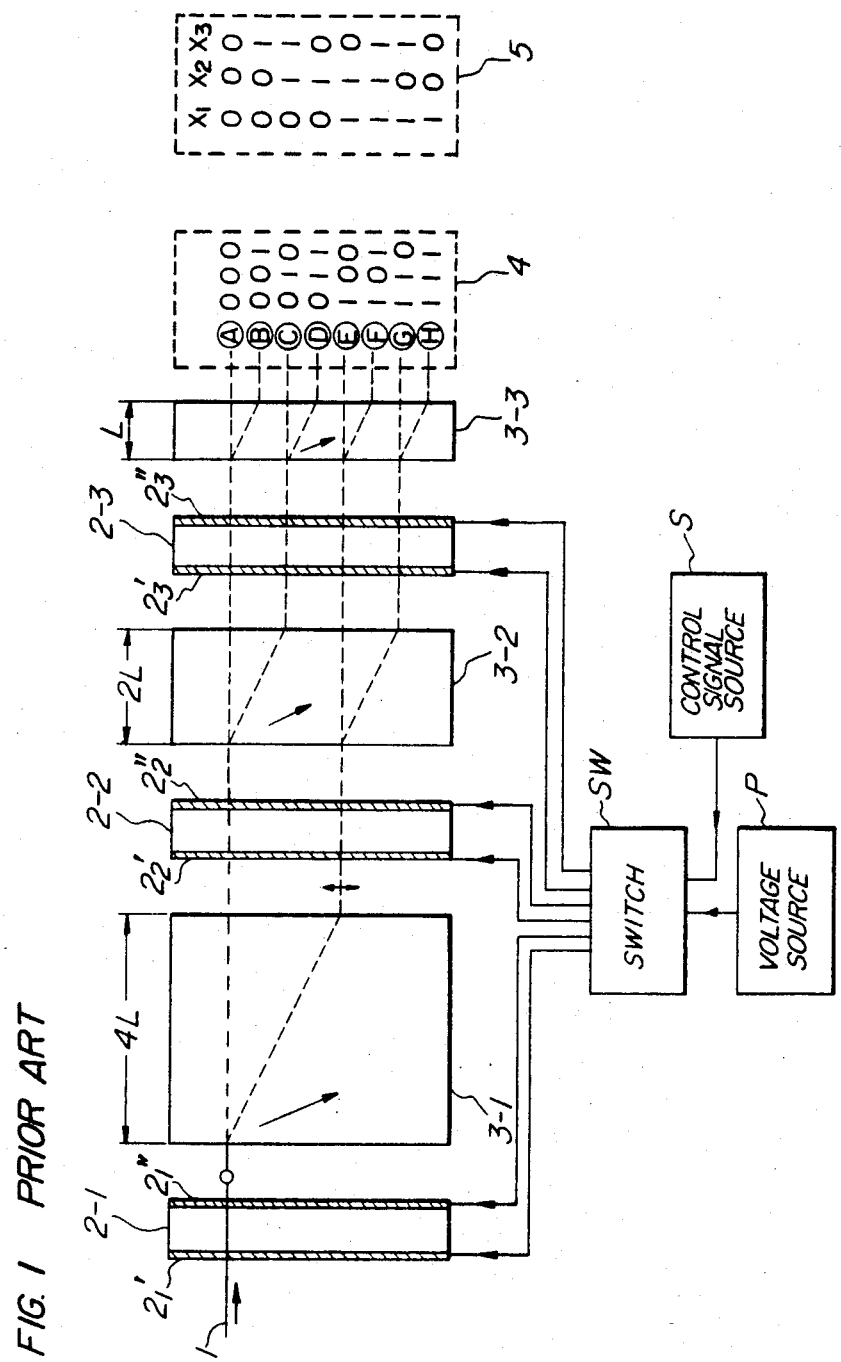
FIG. 1 is a schematic side view of a conventional digital light deflector.

For simplification of explanation, a cascade arrangement of three light deflection units is shown in FIG. 1.

Figure 2:
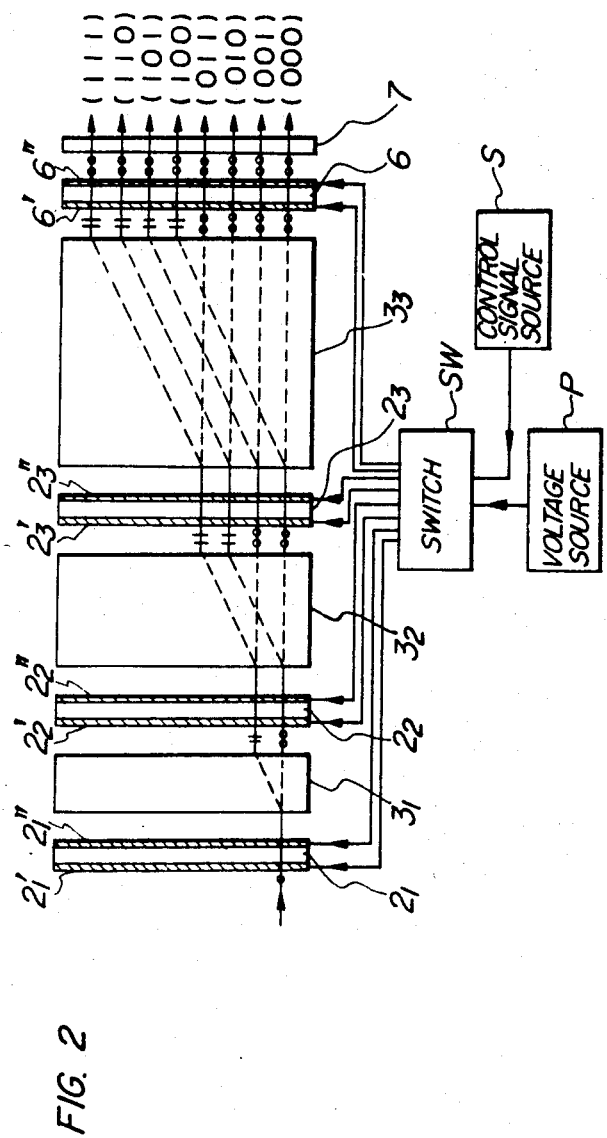
FIG. 2 is a schematic side view of an embodiment of the present invention.
Figure 3:
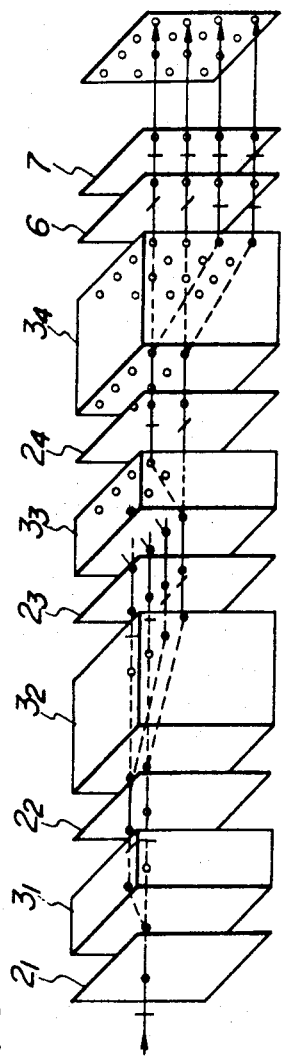
FIG. 3 is a schematic perspective view of another embodiment of the present invention.

In FIG. 1, 2-1, 2-2, and 2-3 designate crystals with electro-optical effect such as potassium dihydrogen phosphate (hereinafter referred to as KDP), having a pair of opposite faces cut perpendicularly to the c-axis thereof, said c-cut faces being provided thereon with transparent electrodes $2_1'$, $2_1''$; $2_2'$, $2_2''$; $2_3'$, $2_3''$, respectively, to which a voltage is applied. 3-1, 3-2, and 3-3 designate uniaxial birefringent crystals respectively cut with such a specified angle with respect to an optic axis thereof that an ordinary ray can travel perpendicularly to its opposite cut faces. This angle will be hereinafter referred to as the "cutting angle" of the crystal. This "cutting angle" is characteristic of the respective crystals, for example, as follows:

| CRYSTAL | CUTTING ANGLE |
|---------|---------------|
| $NaNO_3$ | 49° |
| $CaCO_3$ | 51° |
| KDP | 54° |

Uniaxial birefrignent crystals 3-1, 3-2, and 3-3 are arranged in such a manner that the thicknesses between respective opposite faces thereof are changed in a binary relation, for example, they increase with a ratio of 4 : 2 : 1 or decrease with a ratio of ¼ : ½ : 1 in their succession towards the light output side of the deflector.

An electro-optic effect in a crystal will hereinafter refer to such an effect showing such a change of refraction index that due to the application of an electric field to the crystal in parallel to the optic axis thereof a refraction index $n$ for a specific light ray traveling in parallel to an optic axis in the crystal and having a plane of polarization parallel to the $a$- and $b$-axis is represented by the formula, $$\eta = \eta_0 \left(1 \pm \frac{\gamma 63}{2} E_z \eta_0^2\right)$$

where, $\eta_0$ is a refraction index for an ordinary ray when the applied electric field $E = 0$, $\gamma_{63}$ is a linear electro-optic coefficient and $E_z$ is a c-axis component of the applied electric field E. The crystal showing such an effect will be referred to an electro-optic crystal, hereinafter.

On c-planes or c-faces which are perpendicular to the c-axis of respective electro-optic crystals 2-1, 2-2 and 2-3, there are provided with transparent electrodes $2_1'$, $2_1''$ : $2_2'$, $2_2''$: $2_3'$, $2_3''$ so as to apply to the crystals therethrough a half-wavelength voltage that gives a retardation of 180° to a linearly polarized light having a plane of polarization parallel to the $a$- and $b$-axes when it passes through the crystal, for example 7KV for a light applied to the c-planes of KDP. Hereinafter, such an electro-optic crystal with electrodes as mentioned above, is referred to as an electro-optic crystal element. 4 designates a binary representation of a deflected light beam applied to a detector and 5 represents a combination of voltages to be applied to the respective electro-optic crystals constituting a light deflector, where "1" represents a state of voltage application and "0" represents a state of no voltage application. P designates a half-wavelength voltage source and S designates a control signal source for instructing a switch SW to apply a voltage to a predetermined electro-optic crystal for a desired representation. $SnO_2$, $TiO_2$, $ZrO_2$ or the like is used for transparent electrodes located at c-plates of the above-mentioned electro-optic crystal.

Supposing a plane-polarized light having a plane of polarization perpendicular to the drawing sheet, is applied to such a light deflector as mentioned above, it operates as follows:

1. When no modulation voltage is applied to any crystal 2-1, 2-2 or 2-3, the applied plane-polarized light 1 goes straight on to a no-deflected position A, and
2. when a modulation voltage is applied to the crystal 2-3 only, a plane of polarization of the light transmitted out from the crystal 2-3 rotates 90° and the plane-polarized light having such a plane of polarization is refracted in the birefringent crystal 3-3 and reaches a deflected position B (represented by B).

Thus, light applied to the light deflector can be deflected to any position from A to H by selectively applying voltages to the respective electro-optic crystals 2-1, 2-2 and 2-3, according to such a combination thereof as shown by 5.

In this description, an arrangement of three stages of light deflection units constituted by an electro-optic crystal element and a uniaxial birefringent crystal has been explained. More generally, a light deflector composed of n stages of light deflection units can deflect light to form $2^n$ beams. If the optic axis of a uniaxial birefringent crystal in one stage of light deflection unit (that is, constituted by an electro-optic crystal element and a uniaxial birefringent crystal) is arranged orthogonally to an optic axis of a uniaxial birefringent crystal element in any other stage of a light deflection unit, light is deflected into $2n/2 \times 2n/2$ beams to obtain a two-dimentional pattern. And, if a cascade arrangement of light deflection units is selected preferably, vibration planes, or plane of polarization, of light beams deflected to the upper half portion can be put in order. The light beams on the lower half portion have vibration planes rotated 90° to those in the upper portion.

Such a conventional light deflector has following drawbacks.

If a half-wavelength voltage is precisely applied to the crystal, a beam can reach the desired display plate, but if not, a light passed through this crystal becomes elliptically polarized light having its polarization component in each direction so that it is deflected into undesired portions. Therefore, the S/N (signal to noise) ratio for the deflected light is decreased.

The electro-optic crystal is a capacitive load when seen from a voltage source. In the practical driving of a light deflector, it is convenient to apply a voltage to a plurality of electro-optic crystals through a switch circuit from one common voltage source. The voltage in this case may decreased in comparison with the case of applying a voltage to one crystal. Therefore, the half-wavelength voltage applied to a plurality of crystals may deviate from the precise half-wavelength voltage. For example, in such an electro-optic crystal as deuterated potassium dihydrogen phosphate (hereinafter referred to as DKDP) having a larger dielectric constant than KDP, the voltage deviation is not negligible even in the case of cascade arrangement of a few stages.

SUMMARY OF THE INVENTION

It is an object of the present invention to provide a digital light deflector wherein such a as mentioned above is eliminated, that is, to provide a digital light deflector deflecting a light beam precisely in the desired direction of representation with a large S/N ratio.

The present invention attains such an object as mentioned above by providing a combination of an additional electro-optic crystal element provided with transparent electrodes on the opposite c-cut faces thereof through which the half-wavelength voltage is applicable to the crystal and a polarizing plate in alignment with the last stage light deflection unit of the conventional digital light deflector. The said deflector is turned on or off depending on whether the number of operating electro-optic crystal elements is even or odd for precisely controlling the path of the light beam passing through the said deflector digitally by selectively applying the half-wavelength voltage to specific electro-optic crystal elements and by applying no voltage to the rest of the electro-optic crystal elements. In the case of applying the half-wavelength voltage to only an even number of electro-optic crystal elements of the deflector, the plane of polarization of the light beam emitted from the digital light deflector can be made to coincide with that of the input light beam applied to this deflector. On the contrary, if the number of the operating electro-optic crystal elements in the digital light deflector is odd, the plane of polarization of the output light beam is orthogonal to that of the input light beam.

Therefore, by arranging the polarizing plate after the last stage light deflection unit of the aforementioned digital light deflector, the light beam can be always deflected to the desired positions by means of the polarization plate. Even if the light beam becomes elliptically polarized light by the error in modulation efficiency of the light deflection unit and is divided into two undesired beams in the birefringent crystal, the plane of polarization of the undesired beams can be shut off, since it is orthogonal to that of the desired beam.

In addition, in the aforementioned digital light deflector, for example, when an even number of electro-optic crystal elements are controlled to be in the ON state, the desired beam can be shut off by controlling the deflecting electro-optic crystal element to be in the OFF state so that a kind of switching operation can be performed. Since the light beam is shut off when one or an odd number of electro-optic crystal elements malfunction with the input signal, a parity check operation can be also performed. The plane of polarization of the deflected light beam can be freely operated by arranging the electro-optic crystal element and the polarizing plate in addition to the conventional digital light deflector as mentioned above. It is also possible to improve the signal to noise ratio resulting from the errors of the modulation index of the light beam.

DESCRIPTION OF THE PREFERRED EMBODIMENTS

The present invention will be described with reference to the preferred embodiments, hereinafter.

EMBODIMENT 1

FIG. 2 shows an embodiment of the present invention applied to the conventional digital light deflector of eight one-dimensional points. In FIG. 2, $2_1$, $2_2$ and $2_3$ designate electro-optic crystal elements provided with $SnO_2$ film $2_1'$, $2_1''$; $2_2'$, $2_2''$; $2_3'$, $2_3''$ respectively on the c-faces of KDP crystal. Said $SnO_2$ operates as an electrode and is connected to a switching circuit SW, voltage source P and control signal generator S. $3_1$, $3_2$ and $3_3$ designate calcite crystals having opposite faces cut at an angle of 51° with respect to the optic angle of the crystal, which constitute, uniaxial birefringent crystal elements. These birefringent crystals alternately combined with the electro-optic crystal elements are arranged in such a manner that the thicknesses of the said birefringent crystals increase in a binary sequence relation from the input side towards the output side of the deflector. The light beam transmitted from the uniaxial birefringent crystal element $3_3$ of the last stage passes through an additional electro-optic crystal element 6 provided with transparent electrodes 6', 6'' ($SnO_2$ films) on the c-faces of the KDP crystal and a polarizing plate 7.

Said electro-optic crystal element 6 is connected to the voltage source P as well as $2_1$, $2_2$ and $2_3$ and can be made to perform the required operation by the switching circuit SW operating according to a control instruction the control signal source S.

In order to obtain a deflected beam having the plane of polarization in parallel to that of the incident light in such a deflector, the electro-optic crystal element 6 is controlled to be turned ON or OFF according to the result of a simple logic operation on the input signal so that the number of ON elements out of the electro-optic crystal elements $2_1$, $2_2$, $2_3$ and 6 is even. In FIG. 2, the electro-optic crystal element 6 is controlled to be turned OFF since even elements out of the electro-optic crystal elements $2_1$, $2_2$, $2_3$ and 6 are in ON state in the lower portion of the birefringent crystal $3_2$. The crystal 6 is controlled to be turned ON since the number of ON elements is odd in the upper portion of the crystal $3_2$. Desired light beams transmitted from the light modulator 6 have the same plane of polarization at any deflected position and so can pass through the polarizing plate 7. A light beam leaking into undesired positions from each stage of the uniaxial birefringent crystal due to an error in the modulation efficiency of the respective electro-optic crystal element has a plane of polarization which is orthogonal to that of the desired beam. This condition is unvarying since all the light beams undergo the same modulation at the electro-optic crystal element 6. Therefore, such a leakage is shut off by the polarizing plate 7.

In the case of deflecting the light beam to the position (100), for example, the electro-optic crystal element $2_3$ is turned ON and the electro-optic crystal elements $2_1$ and $2_2$ are turned OFF. The beam having a plane of polarization within the space is obtained on the position (000) from the birefringent crystal element $3_3$ and a first-order leakage having a plane of polarization that is perpendicular to the drawing sheet appears on the position (000). In this case, if the electro-optic crystal element 6 is turned ON, the plane of polarization of the transmitted light rotates 90° to that of the incident light so that the polarizing plate 7 transmits the beam to the position (100) and shuts off the leakage to the position (000). Therefore, the S/N ratio can be improved by arranging the planes of polarization.

If the electro-optic crystal element 6 is turned OFF (or, the half-wavelength voltage is not applied thereto), the desired beam is shut off and so a switching operation can be performed. If the electro-optic crystal element $2_3$ misoperates on the signal, the light is deflected to the position (000). However, when the electro-optic crystal element is ON, the light beam has a plane of polarization within the space to be shut off by the polarizing plate. That is, parity check can be performed.

EMBODIMENT 2

FIG. 3 shows another embodiment of the present invention which comprises a conventional two-dimensional four-points light deflector for deflecting a beam in the direction of two orthogonal axes by means of electro-optic crystal elements $2_1$, $2_2$, $2_3$ and $2_4$ and uniaxial birefringent crystals $3_1 3_2$, $3_3$ and $3_4$ and which is characterized by employing an additional electro-optic crystal element 6 and a polarizing plate 7 in alignment with the conventional light deflector. The electro-optic crystal element 6 is controlled in the same manner as in the embodiment 1. When an odd number of the electro-optic crystal elements $2_1$, $2_2$, $2_3$ and $2_4$ are turned ON, the light beam is deflected into any one of eight points in the upper portion. In this case, if the electro-optic crystal element 6 is turned ON, all the beams having the same plane of polarization as that of the incident beam are obtained. Therefore, an improvement in the S/N ratio, switching operation and a parity check operation on digitally polarized light can be performed in the same manner as in the embodiment 1.

We claim:

1. A digital light deflector comprising:

a plurality of light deflection units each of which comprises an electroyoptic crystal element having opposite faces cut perpendicularly to the c-axis thereof and provided with a pair of transparent electrodes on said opposite faces thereof, and a uniaxial birefringent crystal having opposite faces cut at its cutting angle specified with respect to the optic axis thereof and aligned with the electro-optic crystal element, said light deflectors being aligned in cascade to form an alternate alignment therewith, and the thicknesses of the respective birefringent crystals being different from each other;

input means for supplying an input light beam to one of the outermost electro-optic crystal elements of the first stage deflection unit of said alternate alignment;

an electro-optic crystal element disposed behind the last stage deflection unit, the two principal axes of said electro-optical crystal being at an angle of 45° with the vibration plane of linearly polarized input light;

a polarizing plate disposed behind the last named electro-optic crystal element, the orientation of the polarization plane of said polarizing plate being at an angle of one of 0° and 90° with said vibration plane of said linearly polarized input light; and control means for selectively supplying a half-wavelength voltage for the electro-optic crystal elements to the respective pair of electrodes of the electro-optic crystal elements, whereby the plane of polarization of the light beam applied is rotated in the respective electro-optic crystal elements in response to the application of the voltage and an output light beam is obtained from the polarizing plate.

* * * * *